United States Patent
Dash et al.

(10) Patent No.: US 11,065,686 B2
(45) Date of Patent: Jul. 20, 2021

(54) METHOD FOR SINTERING METALS, NON-OXIDE CERAMICS AND OTHER OXIDATION-SENSITIVE MATERIALS

(71) Applicant: FORSCHUNGSZENTRUM JUELICH GmbH, Juelich (DE)

(72) Inventors: Apurv Dash, Juelich (DE); Jesus Gonzalez, Aachen (DE); Robert Vassen, Herzogenrath (DE); Olivier Guillon, Juelich (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 0 days.

(21) Appl. No.: 16/623,809

(22) PCT Filed: Jun. 8, 2018

(86) PCT No.: PCT/DE2018/000179
§ 371 (c)(1),
(2) Date: Dec. 18, 2019

(87) PCT Pub. No.: WO2019/011359
PCT Pub. Date: Jan. 17, 2019

(65) Prior Publication Data
US 2020/0171575 A1    Jun. 4, 2020

(30) Foreign Application Priority Data
Jul. 13, 2017   (DE) .................... 10 2017 006 659.0

(51) Int. Cl.
| B22F 7/00 | (2006.01) |
| B22F 3/16 | (2006.01) |
| C04B 35/56 | (2006.01) |
| C04B 35/63 | (2006.01) |
| C04B 35/638 | (2006.01) |
| C04B 35/645 | (2006.01) |

(52) U.S. Cl.
CPC ............ *B22F 7/008* (2013.01); *B22F 3/16* (2013.01); *C04B 35/5615* (2013.01); *C04B 35/6303* (2013.01); *C04B 35/638* (2013.01); *C04B 35/6455* (2013.01); *B22F 2301/052* (2013.01); *B22F 2301/10* (2013.01); *B22F 2301/205* (2013.01); *B22F 2302/05* (2013.01); *C04B 2235/3843* (2013.01); *C04B 2235/604* (2013.01); *C04B 2235/656* (2013.01)

(58) Field of Classification Search
CPC ..................................................... B22F 3/1266
See application file for complete search history.

(56) References Cited

U.S. PATENT DOCUMENTS

| 4,108,652 A * | 8/1978 | Ogawa .................. B22F 3/1266 264/125 |
| 5,445,787 A | 8/1995 | Aslund et al. |
| 5,828,942 A * | 10/1998 | Tsutsumi .................. B22F 3/04 419/38 |
| 2002/0011550 A1 * | 1/2002 | Herzbach .................. B22F 5/10 249/79 |

FOREIGN PATENT DOCUMENTS

| DE | 702877 C | 2/1941 |
| GB | 1405749 A | 9/1975 |

OTHER PUBLICATIONS

Yang, et al. "Molten Salt Synthesis of Mo$_2$C Powder Using a Mechanically Milled Powder," *Elsevier* 61, 26: 4815-4817 (Oct. 1, 2007), XP022230643.

* cited by examiner

*Primary Examiner* — Anthony J Zimmer
*Assistant Examiner* — Michael J Kachmarik
(74) *Attorney, Agent, or Firm* — Leydig, Voit & Mayer, Ltd.

(57) ABSTRACT

A method for sintering metallic and/or non-oxide components includes completely encapsulating, in a metal halide salt, a green body comprising at least one metallic and/or non-oxide powder, and compressing the encapsulated green body so as to be gastight. The method further includes heating, together with a metal halide salt in the presence of oxygen up to sintering temperatures, the compressed, encapsulated green body. The method additionally includes at least partially dissolving, after cooling, the metal halide salt in a liquid so that the sintered component can be removed.

20 Claims, No Drawings

METHOD FOR SINTERING METALS, NON-OXIDE CERAMICS AND OTHER OXIDATION-SENSITIVE MATERIALS

CROSS REFERENCE TO RELATED APPLICATIONS

This application is a U.S. National Phase Application under 35 U.S.C. § 371 of International Application No. PCT/DE2018/000179, filed on Jun. 8, 2018, and claims benefit to German Patent Application No. DE 10 2017 006 659.0, filed on Jul. 13, 2017. The International Application was published in German on Jan. 17, 2019 as WO 2019/011359 under PCT Article 21(2).

FIELD

The invention relates to the sintering of materials, in particular to the sintering of oxidation-sensitive materials, such as metals or non-oxide ceramics, which are available as powder in their starting form.

BACKGROUND

The term "sintering" is generally understood to mean a process for the production or modification of materials in which fine-grained ceramic or metallic substances are heated, partly also under increased pressure. However, since the maximum sintering temperatures are set below the melting temperature of the main components, the external shape of the workpiece is generally maintained. During sintering, the particles of the starting material compact and thus fill the pore spaces. Shrinkage regularly occurs.

Heat treatment during sintering causes a solid workpiece to be produced from a fine- or coarse-grained green body which was shaped in a preceding process step, for example by means of extrusion. The sintering step gives the green bodies the desired final properties, such as hardness, strength or thermal conductivity, which are required in the particular application.

It is known that both synthesizing and sintering steps for non-oxide materials are usually carried out in a protected atmosphere or in a vacuum in order to prevent oxidation of the material in the presence of oxygen. It is thus an unavoidable requirement that the processing of oxide-sensitive materials which must be protected from unwanted oxidation is routinely carried out in a protected atmosphere of argon, nitrogen, or in vacuo.

Also known is the synthetizing route for oxide and carbide ceramic powders via a molten salt. In this process, too, a protective atmosphere or vacuum is always set, which pushes up the cost of such synthesis.

Powder metallurgy is a known manufacturing process for small and non-trivial geometries, each beginning with a starting powder. Both metallic and ceramic materials are suitable for this purpose. Of all production steps, the sintering process is regularly the most energy-intensive step. In this respect, the sintering step is crucial to and critical for the subsequent properties of the materials produced, since the sintering of the metals or of the non-oxide ceramics is accompanied by an unavoidable oxidation of the materials.

As a rule, the sintering step for metals and non-oxide ceramics takes place in a closed protective atmosphere and/or in a vacuum. However, since even in a good vacuum of less than 1 mbar, oxygen is present in the form of the oxygen partial pressure, oxidation of the material to be sintered inevitably occurs. This in turn affects the sintering process and leads to an oxidic second phase and consequently to worse compaction of the material.

The necessity of a protective atmosphere is based on the fact that, as the temperature increases, the oxidation rate of the aforementioned materials increases greatly, and thus formation of further oxidic phases takes place until the starting material is entirely converted into the corresponding oxides.

For this reason, a protective atmosphere, such as pure hydrogen or a mixture of hydrogen and argon, which have only a very low oxygen partial pressure, is generally used in sintering steps. Nevertheless, it cannot be ruled out that residues of oxygen creep in at any point in the sintering process, and since pulverulent materials, in particular fine-grained metal powders, are known to behave like tinder, there will always be some type of oxidation on the surface of the material to be sintered.

The sintering step under a protective gas atmosphere therefore always requires a continuous flow and a gastight furnace which separates the sintering chamber from the ambient atmosphere. The continuous gas flow, which as a rule cannot be renewed or recycled, thus makes a not inconsiderable contribution to the production costs of the sintered material. Gastight furnaces are also a cost factor that should not be underestimated.

Alternative pressure-assisted sintering processes, such as hot pressing, hot-isostatic pressing, or flame-assisted plasma sintering, can preferably be carried out in a vacuum. However, the corresponding vacuum apparatuses and their operation are also very cost-intensive.

SUMMARY

In an embodiment, the present invention provides a method for sintering metallic and/or non-oxide components. The method includes completely encapsulating, in a metal halide salt, a green body comprising at least one metallic and/or non-oxide powder, and compressing the encapsulated green body so as to be gastight. The method further includes heating, together with a metal halide salt in the presence of oxygen up to sintering temperatures, the compressed, encapsulated green body. The method additionally includes at least partially dissolving, after cooling, the metal halide salt in a liquid so that the sintered component can be removed.

DETAILED DESCRIPTION

Embodiments of the invention provide an alternative sintering process for the production of densified, oxidation-sensitive materials, such as metals or non-oxide ceramics, which sintering process is significantly more cost-effective than previous processes, and in which sintering process the use of protective gas or vacuum can be dispensed with, in particular when sintering oxidation-sensitive materials.

In the context of the invention, it was found that in the densification (sintering) of oxidation-sensitive materials, in particular of metallic or non-oxide ceramic components, it is possible to dispense with the hitherto customary protective atmosphere or the use of a vacuum without the oxidation-sensitive material undergoing oxidation.

In the method according to the invention, the metallic or non-oxide ceramic components (green bodies), which were generally synthesized by means of a powder-metallurgical process, are heated in the presence of air or oxygen together with at least one metal halide salt to above the melting point thereof so that the components to be sintered are arranged in a salt melt (melt pool) which effectively prevents any supply of oxygen to the metallic or non-oxide ceramic components.

A multiplicity of methods is available for shaping the pulverulent starting materials, such as matrix pressing, extrusion or even additive manufacturing, such as 3D printing. As soon as the pulverulent components acquire a certain strength through pressure application, the components are also referred to as green bodies.

The metal halide salt into which the green body to be sintered is embedded according to the invention forms a salt melt at higher temperatures above its melting temperature, and thereby functions as a medium which serves as a protection against the oxygen present. To this end, the molten salt forms an impermeable melt pool having a solubility for oxygen which scarcely differs from zero. As a result, dissolution of the oxygen from the oxygen-containing atmosphere present in the melt pool is effectively prevented and diffusion to the oxidation-sensitive green body is reliably prevented. In this respect, the molten salt functions as a kind of oxidation barrier between the oxidation-sensitive component (green body) to be sintered and the oxygen-containing atmosphere surrounding it.

For the time until the melting point is reached, a contact between oxygen and the oxidation-sensitive green body is prevented by the green body having been previously provided with a gastight encapsulation of metal halide salt which effectively prevents oxygen being supplied to the green body until the melting temperature of the metal halide salt bath is reached.

For such a metal halide salt bath, all water-soluble alkaline or alkaline earth salts whose melting points lie below the sintering temperatures of the materials to be sintered can be used, for example. Chlorides or bromides of sodium or potassium, in particular, are particularly advantageous on account of their low melting points and high solubility in water. Solubility in water is crucial here to separating the sintered components after sintering in a simple manner from the metal halide salt surrounding them.

The metal halide salt (NZ) used is a salt where N=at least one element from the group (Li, Na, K, Rb, Cs, Mg, Be, Ca, Ba) and Z=at least one element from the group (F, Cl, Br, I) or a mixture of corresponding metal halide salts.

According to the invention, the components intended for sintering are embedded as green bodies in at least one suitable metal halide salt or encapsulated therein. In a further method step, it is ensured in the process that the salt-like encapsulation is on the one hand complete with respect to the green body and the encapsulation is on the other hand densified and thus impermeable to oxygen.

The compressed salt in the encapsulation regularly has a theoretical density of more than 90%, advantageously even more than 95%. Although the compressed salt still has individual pores, these pores are not continuous so that all in all there is a hermetic, gastight seal with respect to the pellet embedded therein.

The encapsulation of the components to be sintered and the densification of the metal halide salt surrounding the green body can be effected, for example, by uniaxial pressing or by isostatic pressing of the components to be sintered in a press mold which has a greater diameter than the components to be sintered. This method step is carried out at moderate temperatures up to 200° C., in particular advantageously at room temperature. Pressing takes place in particular at pressures between 10 MPa and 1000 MPa. It is important for the method according to the invention that the salt jacket completely encloses the component (green body) to be sintered.

Halogen salts can be densified to green-body densities greater than 95% of their theoretical density. This phenomenon is based on the ductility of halogen salts under certain pressure conditions at room temperature. The green body has a low porosity, but at this porosity, the pores are closed so that the encapsulation is to be regarded as gastight within the context of this invention.

Permeability measurements with helium and air on KBr tablets compacted under the same pressure and temperature conditions resulted in permeability values of $1.4 \cdot 10^{-7}$ hPa $dm^3.s^{-1}$, which may be regarded as gastight for the purposes of the present invention.

KBr has proved to be a particularly suitable metal halide salt in this respect since it can be compacted very well at room temperature and thus constitutes a very good seal. Furthermore, even when some water was added, NaCl could also be compacted very well, i.e. almost gastight, at room temperature around a component to be sintered.

In the salt melt for the time of heating up to melting, when the surrounding metal halide salt bath still has a certain porosity, the gastight encapsulation of the component to be sintered that has at least one metal halide salt creates an additional barrier between the oxygen-containing atmosphere present and the reactive components of the green body to be sintered. The high density of the compacted metal halide salt is in particular responsible for the hermetic sealing of the green body.

In a first embodiment of the invention, a green body enclosed by at least one metal halide salt is now arranged in a suitable container, for example a crucible, in a metal halide salt bed, in particular completely embedded therein. The metal halide salt used for this purpose can be identical to the metal halide salt which has already been used for the encapsulation of the components to be sintered. However, this is not mandatory.

In the context of this invention, the arrangement in a metal halide salt bed means that the green body is completely enclosed by this metal halide salt. The metal halide salt bed initially has a certain porosity which is lost only upon complete melting.

The crucible with the salt bath and the component pressed with the salt are heated up together. This can take place, for example, in an oven with resistance heating. Preferably, no additional pressure is applied during this heating step. Heating is carried out up to at least 300° C. or up to the melting temperature of the metal halide salt used. If a plurality of different metal halide salts were used, heating is carried out up to at least the temperature at which the metal halide salt mixture melts and forms a liquid salt melt. The crucible can then be heated further up to the temperature required for sintering the components. However, a maximum temperature of 1400° C. should not be exceeded regularly as otherwise there is a risk that the metal halide salt used or a metal halide salt mixture used evaporates to a not inconsiderable degree. It must be ensured that the molten salt in every case completely surrounds the components to be sintered in order to reliably prevent the supply of oxygen.

Advantageously, unlike in the prior art, no particular inert atmosphere must be set in this method step. The method can thus also be carried out in air.

In this method step, the dense encapsulation of the components to be sintered serves to seal off the components from oxygen, which otherwise could lead to undesired oxidation of the components to be sintered in the porous metal halide salt fill during the heating process up until the melting of the salt.

After the heating step, the crucible is cooled again and the contents (sintered green body in a cooled salt bath) are placed in a liquid, preferably in a water bath, the salt at least partially dissolving in the liquid and the sintered component remaining. In addition to pure water, aqueous solutions or short-chain alcohols are also suitable as the liquid, provided the salt used is sufficiently soluble therein.

In this method step, both the salt from the salt bath and the salt from the encapsulation dissolve at least partially in the liquid so that the sintered component can be removed. Optionally, the liquid, in particular the water, may be heated to improve the solubility of the salt.

The amount of liquid determines whether the salt present dissolves not only partially therein but, for example, completely therein. However, what is crucial here is only that the sintered component can be removed from the solidified salt bath. If necessary, the component can subsequently be washed off again separately with a liquid.

In a further embodiment of the invention, metal halide salt is first heated in a suitable container, for example a crucible, up until the melting of the metal halide salt. Analogously to the previous exemplary embodiment, the component to be sintered is initially completely encapsulated in a metal halide salt and compacted to be gastight and then introduced directly into the molten salt or immersed therein. Following this, the temperature of the metal halide salt bath may be further increased, as in the first embodiment, depending on the temperature required for sintering the components, for example, to 800° C. However, a maximum temperature of 1400° C. should not be exceeded even in this method step.

This is followed by the cooling and the at least partial dissolution of the metal halide salt in a liquid in a manner analogous to the first embodiment so that the sintered component can be removed.

In a modification of the method according to the invention, in parallel to the aforementioned method steps, at least one silicate, preferably a sodium, potassium or lithium silicate ($Na_2SiO_3$, $K_2SiO_3$ or $Li_2SiO_3$) may be optionally also heated in a further crucible. This step is advantageously carried out in the same furnace in which the halogen melt bath is heated with the green body so that the molten silicate and the molten salt with the component to be sintered have the same temperature.

At a temperature above the melting point of the silicate used, i.e., for example, around 1100° C. for sodium silicate with a melting point $T_m$=1088° C., the molten silicate is carefully applied to the surface of the salt bath with the green body, in the simplest case poured. Due to the difference in density between the molten metal halide salt of the salt bath and the molten silicate and due to their mutual insolubility, the molten silicate floats on top of the molten metal halide salt. The floating silicate thus advantageously prevents undesired evaporation of the molten metal halide salt from the salt bath. In this way, the temperature for sintering the component can even, if necessary, be increased beyond 1400° C. up to a maximum of 1600° C., without any significant loss of metal halide salt from the salt bath.

This is followed by the cooling and dissolution of the metal halide salt and preferably also of the silicate used in a liquid in a manner analogous to the first embodiments so that the now sintered component can be removed.

It is again noted that the method according to the invention does not describe the synthesis of the components from the corresponding, metallic and/or oxidation-sensitive starting materials but rather only comprises a densification step (sintering) of components (green bodies) previously produced, for example, by means of a powder-metallurgical process. In this case, the method can be applied to all known green bodies, including metals, such as Al, Cu or titanium, alloys or ceramic materials which as yet have regularly required a protected atmosphere during sintering.

Depending on the salt used, the limit of the method according to the invention is only predetermined by the maximum temperature of about 1400° C., since a strong evaporation of the salt can generally occur above these temperatures, and there is the risk that the salt melt pool will no longer ensure the complete encapsulation of the green body to be sintered. All materials sinterable at and below this temperature can thus be regularly used for sintering.

However, if a sufficient amount of metal halide salt is used, a sintering temperature could possibly also be set in which it is accepted that the salt used at least partially evaporates temporarily. It is only necessary to ensure that the green body to be sintered is and remains completely enveloped by molten metal halide salt while the higher temperatures prevail.

For components which require a higher sintering temperature of up to approximately 1600° C., the embodiment with the liquid silicate cover can additionally be resorted to.

The present invention advantageously prevents the high costs which hitherto occurred in sintering steps for the necessary complex monitoring of the furnace atmospheres when using a protective gas, and thus also enables the provision of an inexpensive, industrial sintering process for oxidation-sensitive components, in particular for metals and/or non-oxide ceramics.

The invention is explained in more detail below with reference to several exemplary embodiments, without this limiting the broad scope of protection.

For the production of the sintered metals according to the invention, metallic powders were first pressed to form green bodies which were then encapsulated in a metal halide salt in accordance with the invention and were advantageously correspondingly heated for the sintering process even in the presence of air or oxygen.

First Example

Al powder (Alfa Aesar, ~40 µm) was compressed uniaxially at 500 MPa and then compressed isostatically at 300 MPa into a cylinder having a diameter of 8 mm and a height of 3 mm (pellet).

The cylindrical green body was encapsulated in KBr (Alfa Aesar), typically producing layer thicknesses of the metal halide salt between 1 and 10 mm, preferably between 2 and 4 mm. To this end, the green body was placed in a crucible that was filled with KBr and had a larger diameter than the green body, e.g. a diameter of 20 mm, covered with KBr and then once again compressed at 200 MPa. The green body thus encapsulated in KBr was additionally cold-isostatically pressed at a pressure of 300 MPa. The encapsulation here had a density corresponding to 98% of the theoretical density. The encapsulated green body was then heated up to 600° C. at a heating rate of 5° C./min and held there at 600° C. for about 1 hour. This can be done, for example, in a normal furnace.

After cooling, the sintered aluminum component could be obtained by dissolving in water the metal halide salt surrounding the component or alternatively by breaking out the component from the solidified salt jacket.

The sintered component had a density of 92% of the theoretical density. The corresponding values were obtained by applying the Archimedes principle.

Second Example

Cu powder (Alfa Aesar, ~40 μm) was compressed uniaxially at 500 MPa and then compressed isostatically at 300 MPa into a cylinder having a diameter of 8 mm and a height of 3 mm (green body).

The cylindrical green body was encapsulated in KBr (Alfa Aesar), typically producing layer thicknesses of the metal halide salt between 1 and 10 mm, preferably between 2 and 4 mm. To this end, the green body was placed into a crucible that was filled with KBr and had a larger diameter than the green body, covered with KBr and then again compressed at 200 MPa. The green body thus encapsulated in KBr was additionally cold-isostatically pressed at a pressure of 300 MPa.

The encapsulated green body was then heated up to 900° C. at a heating rate of 5° C./min and held there at 900° C. for about 1 hour.

After cooling, the sintered copper component could be obtained by dissolving the metal halide salt surrounding the component in water in an ultrasonic bath.

The sintered component had a density of 70% of the theoretical density. The corresponding values were obtained by applying the Archimedes principle.

Third Example

Ti powder (Alfa Aesar, ~40 μm) was compressed uniaxially at 500 MPa and then compressed isostatically at 300 MPa into a cylinder having a diameter of 8 mm and a height of 3 mm (green body).

The cylindrical green body was encapsulated in KBr (Alfa Aesar), typically producing layer thicknesses of the metal halide salt between 1 and 10 mm, preferably between 2 and 4 mm. To this end, the green body was placed into a crucible that was filled with KBr and had a larger diameter than the green body, covered with KBr and then again compressed at 200 MPa. The green body thus encapsulated in KBr was additionally cold-isostatically pressed at a pressure of 300 MPa.

The cylindrical green body was arranged in a KBr bed (Alfa Aesar) which contained a sufficient quantity of KBr so that, during heating, a melt pool was produced in which the green body was completely surrounded by the molten salt.

The salt bed with the green body was heated up to 1200° C. at a heating rate of 5° C./min and held there at 1200° C. for about 1 hour.

After cooling, the sintered titanium component could be obtained by dissolving the metal halide salt surrounding the component in water in an ultrasonic bath.

The sintered component had a density of 94% of the theoretical density. The corresponding values were obtained by applying the Archimedes principle.

Fourth Example $Ti_3SiC_2$ powder (Alfa Aesar, ~40 pin) was compressed uniaxially at 200 MPa into a cylinder having a diameter of 8 mm in order to form a green body.

The cylindrical green body was encapsulated in KBr (Alfa Aesar), typically producing layer thicknesses of the metal halide salt between 1 and 10 mm, preferably between 2 and 4 mm. To this end, the green body was placed into a crucible that was filled with KBr and had a larger diameter than the green body, covered with KBr and then again compressed at 200 MPa. The green body thus encapsulated in KBr was additionally cold-isostatically pressed at a pressure of 300 MPa.

The green body was then embedded in a KBr salt bed (Alfa Aesar) in an aluminum crucible which contained a sufficient amount of KBr so that, during heating, a melt pool was produced in which the green body was completely surrounded by molten salt.

The salt bed with the green body was heated from room temperature up to 1250° C. at a heating rate of 5° C./min and held there at 1250° C. for about 1 hour.

After cooling, the sintered component, together with the cold salt, was added to water where the salt surrounding the sintered component dissolved.

The sintered component had a density of 75% of the theoretical density. The corresponding values were obtained by applying the Archimedes principle.

For density determination according to the Archimedes principle, a hydrostatic balance was used. The mass of the body whose density is to be determined is first determined in air, and then a re-weighing takes place, in which the weight force of the body immersed in the water is determined. The difference between the two weighings corresponds to the buoyancy exerted on the body and at the same time to the weight force of the displaced water. Since the density of the water is $1.0 \, g/cm^3$, the volume of the displaced water and thus of the body can be determined.

The salt bed with the green body was heated from room temperature up to 1250° C. at a heating rate of 5° C./min and held there at 1250° C. for about 1 hour.

After cooling, the sintered component, together with the cold salt, was added to water where the salt surrounding the sintered component dissolved.

The sintered component had a density of 75% of the theoretical density. The corresponding values were obtained by applying the Archimedes principle.

For density determination according to the Archimedes principle, a hydrostatic balance was used. The mass of the body whose density is to be determined is first determined in air, and then a re-weighing takes place, in which the weight force of the body immersed in the water is determined. The difference between the two weighings corresponds to the buoyancy exerted on the body and at the same time to the weight force of the displaced water. Since the density of the water is $1.0 \, g/cm^3$, the volume of the displaced water and thus of the body can be determined.

This is then compared with the theoretical density which can be calculated for ceramics and metals via the crystal structure from the mass content of the unit cell corresponding to the lattice constant and its volume.

Furthermore, thermal analyses (differential scanning calorimetry, DSC) and thermogravimetric analyses were carried out for the Ti system with KBr as the metal halide salt, which illustrate the shielding effect of the metal halide salt KBr during synthesis in the presence of air.

Thermal analysis (DSC) was carried out in air on samples with and without KBr encapsulation in order to confirm the prevention of oxidation due to the gastight effect of the KBr encapsulation. The samples without encapsulation show a marked oxidation and a significant increase in mass, while the additionally encapsulated specimens show only minor oxidation. Oxidation is significantly lower with encapsulation and ends once the melting point of KBr has been reached.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for sintering metallic and/or non-oxide ceramic components, the method comprising:
   completely encapsulating, in a metal halide salt, a green body comprising at least one metallic and/or non-oxide ceramic powder;
   after the encapsulating the green body in the metal halide salt, compressing the encapsulated green body so as to be gastight;
   adding the compressed, encapsulated green body directly to a molten metal halide salt bath:
   heating, in the presence of oxygen up to sintering temperatures, the compressed, encapsulated green body in the molten metal halide salt bath; and
   at least partially dissolving, after cooling, the metal halide salt in a liquid so that a sintered metallic and/or non-oxide ceramic component, formed from the green body, can be removed.

2. The method according to claim 1, wherein the pressing is carried out uniaxially or cold-isostatically.

3. The method according to claim 1, wherein the pressing and the encapsulation are carried out at temperatures up to a maximum of 200° C.

4. The method according to claim 1, wherein the heating takes place at a temperature above a temperature at which the metal halide salt melts.

5. The method according to claim 1, wherein the heating takes place up to a maximum temperature of 1400° C.

6. The method according to claim 1, wherein at least one metal halide salt (NZ) is used, wherein N is at least one element from the group (Li, Na, K, Rb, Cs, Mg, Be, Ca, Ba) and Z is at least one element from the group (F, Cl, Br, I) or a mixture thereof.

7. The method according to claim 1, wherein the liquid in which the metal halide salt is at least partially dissolved is water, an aqueous solution, or a short-chain alcohol.

8. A method for sintering metallic and/or non-oxide ceramic components, the method comprising:
   completely encapsulating, in a metal halide salt, a green body comprising at least one metallic and/or non-oxide ceramic powder;
   after the encapsulating the green body in the metal halide salt, compressing the encapsulated green body so as to be gastight;
   arranging the compressed, encapsulated green body in a metal halide salt bath and then heating, in the presence of oxygen, the compressed, encapsulated green body together with the metal halide salt bath up to temperatures above the melting temperature of the metal halide salt and to sintering temperatures of the green body; and
   at least partially dissolving, after cooling, the metal halide salt in a liquid so that a sintered metallic and/or non-oxide ceramic component, formed from the green body, can be removed.

9. The method according to claim 8, wherein a molten silicate is applied to a surface of the metal halide salt bath.

10. The method according to claim 9, wherein the molten silicate comprises a sodium silicate, lithium silicate, or potassium silicate.

11. The method according to claim 9, wherein the heating takes place up to a maximum temperature of 1600° C.

12. The method according to claim 8, wherein the pressing is carried out uniaxially or cold-isostatically.

13. The method according to claim 8, wherein the pressing and the encapsulation are carried out at temperatures up to a maximum of 200° C.

14. The method according to claim 8, wherein the pressing and the encapsulation are carried out at room temperature.

15. The method according to claim 8, wherein the heating takes place at a temperature above a temperature at which the metal halide salt melts.

16. The method according to claim 8, wherein the heating takes place up to a maximum temperature of 1400° C.

17. The method according to claim 8, wherein the metal halide salt and the metal halide salt bath have the same chemical composition.

18. The method according to claim 17, wherein the metal halide salt and the metal halide salt bath have the chemical composition (NZ), wherein N is at least one element from the group (Li, Na, K, Rb, Cs, Mg, Be, Ca, Ba) and Z is at least one element from the group (F, Cl, Br, I) or a mixture thereof.

19. The method according to claim 8, wherein the liquid in which the metal halide salt is at least partially dissolved is water, an aqueous solution, or a short-chain alcohol.

20. The method according to claim 1, wherein the metal halide salt bath is formed from the same chemical composition as the metal halide salt.

* * * * *